Keep & Dummer,
Clothes Sprinkler.
Nº 56,063. Patented July 3, 1866.

Witnesses
George E. Jewett
H. P. Reynolds

Inventor
J. W. Keep
Saml. R. Dummer

UNITED STATES PATENT OFFICE.

J. M. KEEP AND S. R. DUMMER, OF NEW YORK, N. Y.

IMPROVEMENT IN SPRINKLER AND DREDGER.

Specification forming part of Letters Patent No. 56,063, dated July 3, 1866.

*To all whom it may concern:*

Be it known that we, JAMES M. KEEP and SAMUEL R. DUMMER, both of the city, county, and State of New York, have invented a new and useful Improved Sprinkling or Dredging Cup or Vessel, especially intended for salt, pepper, and other powdered condiments, although adapted to other powdered or pulverized substances or materials; and we do hereby declare that the following description, taken in connection with the accompanying plate of drawings, is a full and complete specification of the same, by which our invention may be readily distinguished from all others of a similar class, together with such parts as we claim and desire to have secured to us by Letters Patent.

The object of this invention is to furnish a neat and convenient cup or vessel for the reception of salt, sugar, pepper, or other spices or condiments, or other powdered or finely-grained materials or substances, from which, when so desired, its contents may be discharged or sprinkled in a most convenient manner upon any article or articles of food, or otherwheres, according to the nature of the substance contained in the vessel; and for this purpose our invention consists, principally, in a novel construction or formation of the interior of the cup or vessel, whereby the material or substance contained in it is made to always move or fall toward an opening made at or near the center of its under side or base, in combination with a valve so arranged in such opening that it can be opened or closed at pleasure, and thus, when opened, enable the material with which the vessel is filled, or partially so, to be discharged and sprinkled through it upon the article of food which it is desired to season, or upon any other article or surface, according to the nature of the material contained in said vessel or cup, the said valve, when closed, preventing the escape of any portion of the material contained within the cup or vessel.

Figure 1:
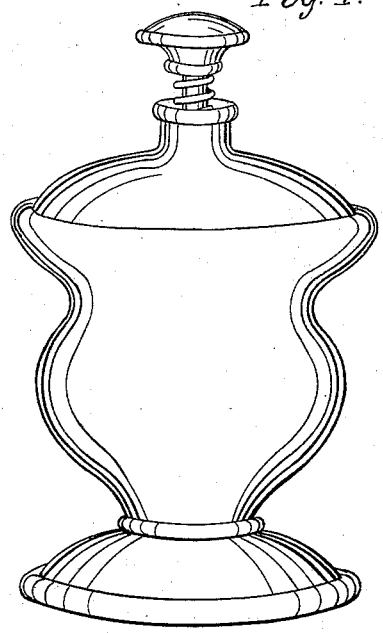
Figure 2:
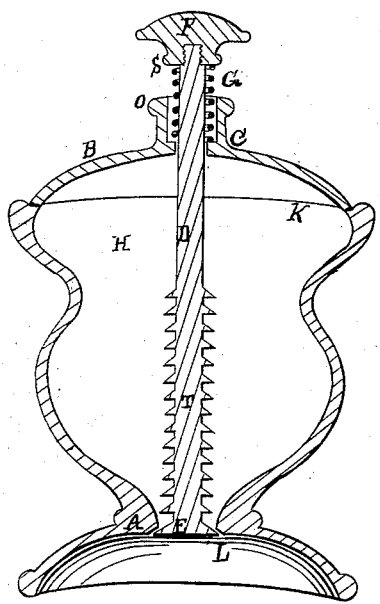

In the accompanying plate of drawings our improved sprinkling cup or vessel is illustrated, Figure 1 being a side elevation of the same; Fig. 2, a central vertical section.

H in the drawings represents the cup or vessel, which, upon its outside, may be made of any desired form, shape, style, and size, but which, it is desirable, should be made of such a shape and size as may be conveniently held by the grasp of the hand or thumb and finger, and also of any material, whether metal, china, glass, gutta-percha, india-rubber, ivory, wood, or any other material. This vessel, at its upper end, K, is opened for convenience of filling. Its inside is made of a tapering or inclined shape or form from its upper or open end down toward its base or bottom L, in which, at or near its center, is made an opening, A, through which the material contained in the vessel or cup H can be discharged in a manner hereinafter described, the downward tapering or inclined sides of the interior of the cup causing the material placed in it to always tend and move toward the discharge-opening at the lower end of such tapered sides, the importance of which will be manifest from the explanation which hereinafter follows.

The edge or periphery of the opening in the bottom of the vessel is beveled or flared outward, as shown at letter A in the drawings, and in this opening fits a similar-shaped valve plate or head, E, secured to the lower end of a vertical stem or rod, D. This rod D passes up through the vessel or cup H and its cover or lid B, and has a knob, F, secured to its upper or projecting end, which, by means of a spiral spring, G, arranged within the interior of the recess or socket O of the upper side of the said cover, and about or around the stem D, between the lower end or shoulder, S, of its knob and the bottom of the said recess O, is caused to be retained at such a height as to keep the valve against its seat in the opening in the bottom of the cup, and thus closing said opening until, by depressing such knob with the finger or thumb of the hand, the valve is opened, when, by the action of such spring, the pressure being removed from the knob, the valve is returned to its seat and again closes the opening in the bottom of the vessel.

The portion of the valve stem or rod D upon the interior of the vessel or cup is provided with a series of teeth, barbs, flanges, or other suitable projections, T, the object of which will be presently explained.

Within the vessel or cup H, having the form upon its inside, and provided with the valve E, as above described, by sufficiently removing its cover B therefrom, is placed the material or substance which it is designed to contain—as, for instance, salt, sugar, pepper, or other spices, or other powdered or finely-grained substances. When replacing the cover upon the vessel such material can then be discharged or sprinkled, in quantities more or less, through the opening in the bottom of the vessel, by simply bearing or pressing down with the finger or thumb of the hand upon the knob F on the outside of the cover B sufficiently to press down the valve from its seat in said opening, which discharge or sprinkling can be greatly facilitated by quickly repeating such up-and-down motion thus given to the valve-stem. Upon the cessation of such pressure and motion given to the valve-stem by the action of the spiral spring the valve E is returned to its seat, thus preventing any further escape of the material contained in the vessel or cup.

By providing the stem of the valve with a series of barbs, teeth, or flanges, it will be perceived that it furnishes means for grating and crushing adhering lumps which may come in contact therewith, thereby obviating the difficulty that has existed in sprinkling-vessels heretofore. The barbs, teeth, or flanges, also at the same time serve to carry the material downward and precipitate it through the opening in the bottom of the cup, all the advantages of which are very obvious.

By the peculiar arrangement herein above explained of the spiral spring G, in connection with the cover of vessel and the knob upon the upper end of the valve-stem, it is apparent that not only does it act to bring the valve to its seat and there hold it, but also to retain the cover firm upon the vessel, while at the same time it freely allows the cover to be sufficiently removed from the cup or vessel to permit it to be filled, or partially so, with the material which it is designed to contain.

By making the valve-seat flaring or beveling, and the valve of a shape corresponding thereto, a more perfect sealing of the opening is secured, and a freer and more perfect discharge of the material from the cup is effected.

From the above description of our improved sprinkling or dredging cup the advantages we claim in the construction of vessels for containing and sprinkling therefrom salt, sugar, pepper, spices, &c., more especially for table use, will be readily seen and appreciated over all other vessels heretofore invented and now in general use, not only in utility and convenience, but as a table ornament; and it is worthy of consideration that our invention does more readily and perfectly secure the material contained within from the action of air and moisture than any other invention for similar use.

We deem it proper to add that, although we have described the vessel or cup H as provided with a cover or lid, such cover may be dispensed with by substituting cross-bars or any other convenience for holding or guiding the valve-stem D and furnishing a rest for the spring G; and, furthermore, in lieu of the spiral spring, a rubber cushion or any other suitable spring may be used; and, if desired, the projections upon the valve-stem may be dispensed with; but with them the desired effect is much better attained, especially if the material be lumpy or inclined to lump.

We claim—

1. The valve-stem D, when provided with teeth, barbs, flanges, or their equivalent, and for the purposes herein described.

2. A combination of the valve-stem D, when barbed or flanged or provided with their equivalents, cup H, spring G, and cover B, operating substantially and for the purposes herein described.

J. M. KEEP.
SAML. R. DUMMER.

Witnesses:
GEO. E. JEWETT,
H. P. REYNOLDS.